(12) United States Patent
Duan et al.

(10) Patent No.: US 8,989,749 B2
(45) Date of Patent: Mar. 24, 2015

(54) METHOD AND APPARATUS FOR A DUAL-NETWORK TERMINAL TO PERFORM COMMUNICATION

(75) Inventors: Hongle Duan, Shenzhen (CN); Guolin Teng, Shenzhen (CN); Qi Yang, Shenzhen (CN); Zhuan Yin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 307 days.

(21) Appl. No.: 13/636,467

(22) PCT Filed: Mar. 7, 2011

(86) PCT No.: PCT/CN2011/071570
§ 371 (c)(1),
(2), (4) Date: Sep. 21, 2012

(87) PCT Pub. No.: WO2012/065387
PCT Pub. Date: May 24, 2012

(65) Prior Publication Data
US 2013/0012266 A1    Jan. 10, 2013

(30) Foreign Application Priority Data
Nov. 15, 2010 (CN) .......................... 2010 1 0543651

(51) Int. Cl.
*H04W 40/00* (2009.01)
*H04W 8/18* (2009.01)
(Continued)

(52) U.S. Cl.
CPC ........... *H04W 8/183* (2013.01); *H04L 63/0853* (2013.01); *H04W 12/06* (2013.01); *H04W 88/06* (2013.01)
USPC ..... 455/445; 455/552.1; 455/558; 455/452.1; 455/436; 455/435.2; 370/353

(58) Field of Classification Search
USPC .................. 455/552.1, 558, 452.1, 436, 445; 370/353
See application file for complete search history.

(56) References Cited

U.S. PATENT DOCUMENTS

2006/0172737 A1* 8/2006 Hind et al. ................ 455/435.2
2009/0131054 A1   5/2009 Zhang
(Continued)

FOREIGN PATENT DOCUMENTS

CN    101175330 A    5/2008
CN    101252741 A    8/2008
(Continued)

OTHER PUBLICATIONS

International Search Report for PCT/CN2011/071570 dated Aug. 8, 2011.

*Primary Examiner* — Christopher M Brandt
*Assistant Examiner* — Joseph Dean, Jr.
(74) *Attorney, Agent, or Firm* — Ling Wu; Stephen Yang; Ling and Yang Intellectual Property

(57) ABSTRACT

An apparatus for performing communication by a dual-network terminal is disclosed by the present invention, wherein the dual-network terminal is a dual-network and dual-standby terminal, and the dual-network and dual-standby terminal comprises an application subsystem, a 3G wireless communication subsystem, a 2G wireless communication subsystem and an identification card management module. The identification card management module is connected with an identification card, which stores information used for the 2G network and 3G network to perform identity authentication, and the 3G wireless communication subsystem is connected with the application subsystem and the identification card management module, and the 2G wireless communication subsystem is connected with the application subsystem and the identification card management module. A method for performing communication by a dual-network terminal is also disclosed by the present invention. The invention is beneficial to the design of hardware and structure, thus saving the cost.

8 Claims, 3 Drawing Sheets

(51) Int. Cl.
*H04L 29/06* (2006.01)
*H04W 12/06* (2009.01)
*H04W 88/06* (2009.01)

(56) References Cited

U.S. PATENT DOCUMENTS

2009/0149220 A1 6/2009 Camilleri et al.
2011/0012987 A1* 1/2011 Yoon .......................... 348/14.02

FOREIGN PATENT DOCUMENTS

| | | |
|---|---|---|
| CN | 101257686 A | 9/2008 |
| CN | 101588614 A | 11/2009 |
| CN | 101820658 A | 9/2010 |
| EP | 1059822 A2 | 12/2000 |
| EP | 2227049 A1 | 9/2010 |

* cited by examiner

METHOD AND APPARATUS FOR A DUAL-NETWORK TERMINAL TO PERFORM COMMUNICATION

TECHNICAL FIELD

The present invention relates to the field of mobile communications, and in particular, to a method and apparatus for performing communication by a dual-network terminal.

BACKGROUND OF THE RELATED ART

With the construction of the 3rd generation mobile communication (3G) network of China is developed progressively, three major mobile communication operators step into the 3G era formally. However, since in the initial stage of the construction of the current 3G network and the following development period, for the coverage level of the 3G network, compared with the 2G network which has already been optimized and improved constantly in more than ten years, there is greater difference in no matter the coverage breadth (the 2G network nearly covers all natural villages of our country) or the coverage depth (such as, indoor, basement and subway and so on), major operators simultaneously regards the long-term dual network co-existence of 2G and 3G as their own operation target and strategy. China Mobile has especially proposed the Three No principle "No card changing, No number changing, No need to register" and all kinds of the Time Division-Synchronous Code Division Multiple Access (TD-SCDMA)/Global system for Mobile Communications (GSM) dual mode and single standby customized cell phone terminal to popularize and run its own TD-SCDMA 3G network.

But the strategy of "co-existence of the 2G and 3G network" and "TD-SCDMA/GSM dual mode and single standby customized terminal" meets the difficulties in the real operation. On one hand, since the existing "2G and 3G dual mode handoff" strategy causes unusual failures, such as the frequent reselection of the cell phone terminal, the serious power consumption, the dropped call, the network being cutoff, even network disconnecting and so on, to take place occasionally and the user experience is worse; on the other hand, since the coverage quality of the existing 3G network is still not so good as the GSM network, which causes that the confidence of the user in the TD-SCDMA network is insufficient. The problem of the network has caused the predicament of the terminal, and conversely, the predicament of the terminal has enlarged the problem of the network.

SUMMARY OF THE INVENTION

The technical problem to be solved by the present invention provides a method and apparatus for performing communication by a dual-network terminal, to implement communication with 2G and 3G network by the dual-network terminal using one SIM card.

In order to solve the above problem, the present invention provides a method for performing communication by a dual-network terminal, wherein the dual-network terminal is a dual-network and dual-standby terminal, and the dual-network and dual-standby terminal comprises: an application subsystem, a 3G wireless communication subsystem, a 2G wireless communication subsystem and an identification card management module, and the identification card management module is connected with an identification card, which stores information used for 2G network and 3G network to perform identity authentication, and the 3G wireless communication subsystem is connected with the application subsystem and the identification card management module, and the 2G wireless communication subsystem is connected with the application subsystem and the identification card management module, and the method comprises:

the identification card management module reading and storing the information in the identification card;

the 2G wireless communication subsystem reading the information of the identification card in the identification card management module, and communicating with the 2G network by using the read information; and the 3G wireless communication subsystem reading the information of the identification card in the identification card management module, and communicating with the 3G network by using the read information.

The method further comprises:

when a subscriber of the dual-network duel-standby terminal initiates a service, the application subsystem selecting a network according to type of service, and when the initiated service is a Packet Switching (PS) service or a video phone service in a Circuit Switching (CS) service, the application subsystem selecting the 3G network, and when the initiated service is the CS service except for the video phone service, the application subsystem selecting the 2G network; and when the selected network meets a condition of signal intensity, a wireless communication subsystem corresponding to the selected network performing communication through the selected network.

The method further comprises:

when the initiated service is a PS service and the application subsystem selects the 3G network, if the application subsystem determines that the PS service cannot be initiated according to the signal intensity of current 3G network monitored by the 3G wireless communication subsystem, notifying the 2G wireless communication subsystem to activate a 2G data link of the 2G network to initiate the service;

in a process of the 3G wireless communication subsystem performing communication through the 3G network while the initiated service is a PS service, if the application subsystem determines that the signal intensity of the current 3G network is reduced to an extent that the PS service cannot be borne according to the signal intensity of the current 3G network monitored by the 3G wireless communication subsystem, the application subsystem notifying the 3G wireless communication subsystem and the 2G wireless communication subsystem to switch a Packet Data Protocol (PDP) data link corresponding to the PS service from a 3G data link to the 2G data link; and when the 2G wireless communication subsystem performs the PS service by using the 2G data link, if the application subsystem determines that the signal intensity of the current 3G network is increased to an extent that the PS service can be borne according to the signal intensity of the current 3G network monitored by the 3G wireless communication subsystem, the application subsystem notifying the 3G wireless communication subsystem and the 2G wireless communication subsystem to switch the PDP data link corresponding to the PS service from the 2G data link to the 3G data link.

Wherein, in the step of the identification card management module reading and storing the information in the identification card, the identification card management module reading and locally storing one or more of three parameters in the identification card: a Public Land Mobile Network (PLMN) identifier, a Temporary Mobile Subscriber Identity (TMSI) and a Location Area Identification (LAI).

The method further comprises:

in the process of the 2G wireless communication subsystem communicating with the 2G network, if there is a need to transmit an International Mobile Subscriber Identification Number (IMSI) of the identification card to the 2G network, the 2G wireless communication subsystem accessing the identification card through the identification card management module and obtaining the IMSI of the identification card; and in the process of the 3G wireless communication subsystem communicating with the 3G network, if there is a need to transmit the IMSI of the identification card to the 3G network, the 3G wireless communication subsystem accessing the identification card through the identification card management module and obtaining the IMSI of the identification card.

Wherein, the 3G network is a Time Division-Synchronous Code Division Multiple Access (TD-SCDMA) network, a Wideband Code Division Multiple Access (WCDMA) network or a CDMA2000 network, and the 2G network is a Global System for Mobile Communications (GSM) network or a Code Division Multiple Access (CDMA).

In order to solve the above problem, the present invention provides an apparatus for performing communication by a dual-network terminal, wherein, the dual-network terminal is a dual-network and dual-standby terminal, and the dual-network and dual-standby terminal comprises: a 3G wireless communication subsystem, a 2G wireless communication subsystem, and an identification card management module, and the identification card management module is connected with an identification card, which stores information used for 2G network and 3G network to perform identity authentication, and the 3G wireless communication subsystem is connected with an application subsystem and the identification card management module, and the 2G wireless communication subsystem is connected with the application subsystem and the identification card management module, wherein, the identification card management module is configured to read and store the information in the identification card;

the 2G wireless communication subsystem is configured to read the information of the identification card in the identification card management module, and communicate with the 2G network by using the read information;

the 3G wireless communication subsystem is configured to read the information of the identification card in the identification card management module, and communicate with the 3G network by using the read information.

The apparatus further comprises the application subsystem;

the application subsystem is configured to: when a subscriber of the dual-network duel-standby terminal initiates a service, select a network according to type of the service, and when the initiated service is a Packet Switching (PS) service or a video phone service in a Circuit Switching (CS) service, select the 3G network and notify the 3G wireless communication subsystem, and when the initiated service is the CS service except for the video phone service, select the 2G network and notify the 2G wireless communication subsystem;

the 3G wireless communication subsystem is further configured to monitor a signal intensity of current 3G network, and notify the application subsystem of the signal intensity of the current 3G network; and when the application subsystem selects the 3G network and the 3G network meets a condition of the signal intensity, perform communication through the 3G network;

the 2G wireless communication subsystem is further configured to: when the application subsystem selects the 2G network and the 2G network meets the condition of the signal intensity, perform communication through the 2G network.

Wherein, the application subsystem is further configured to: when the initiated service is a PS service, if determining that the PS service cannot be initiated according to the signal intensity of the current 3G network monitored by the 3G wireless communication subsystem, notify the 2G wireless communication subsystem to activate a 2G data link of the 2G network for initiating the PS service; in the process of performing communication through the 3G network while the initiated service is the PS service, if determining that the signal intensity of the current 3G network is reduced to an extent that the PS service cannot be borne according to the signal intensity of the current 3G network monitored by the 3G wireless communication subsystem, notify the 3G wireless communication subsystem and the 2G wireless communication subsystem, and switch a Packet Data Protocol (PDP) data link corresponding to the PS service from a 3G data link to the 2G data link; and further configured to when the 2G wireless communication subsystem performs the PS service by using the 2G data link, if determining that the signal intensity of the current 3G network is increased to an extent that the PS service can be borne according to the signal intensity of the current 3G network monitored by the 3G wireless communication subsystem, notify the 3G wireless communication subsystem and the 2G wireless communication subsystem, and switch the PDP data link corresponding to the PS service from the 2G data link to the 3G data link.

Wherein, the identification card management module is configured to read and store the information in the identification card according to a following mode: when reading and storing the information in the identification card, reading and locally storing one or more of three parameters in the identification card: a Public Land Mobile Network (PLMN) identifier, a Temporary Mobile Subscriber Identity (TMSI) and a Location Area Identification (LAI).

Wherein, the 2G wireless communication subsystem is further configured to: in the process of communicating with the 2G network, if there is a need to transmit an International Mobile Subscriber Identification Number (IMSI) of the identification card to the 2G network, access the identification card through the identification card management module and obtain the IMSI of the identification card;

the 3G wireless communication subsystem is further configured to: in the process of communicating with the 3G network, if there is a need to transmit the IMSI of the identification card to the 3G network, access the identification card through the identification card management module and obtain the IMSI of the identification card.

Wherein, the 3G network is a Time Division-Synchronous Code Division Multiple Access (TD-SCDMA) network, a Wideband Code Division Multiple Access (WCDMA) network or a CDMA2000 network, and the 2G network is a Global System for Mobile Communications (GSM) network or a Code Division Multiple Access (CDMA) network.

With the method and apparatus according to the present invention, a dual-network dual-standby function can be implemented by merely using a single SIM card, and compared with other terminals with dual-network dual-standby dual-card dual-number, it is beneficial to the design of the hardware and structure, thus saving the cost. Compared with the existing 2G and 3G dual-mode single-standby terminal technology, the present invention reduces the probability of dual-mode switching by the dual-network dual-standby technology (there is a part of switching only during the data service) while taking account of the specialty of the CS domain service of the 2G network and the specialty of the data service of the 3G network, and thereby fundamentally reducing and avoiding faults such as frequent network reselection, serious power consumption, dropped call, off-line and so on of the 2G and 3G dual-mode single-standby terminal due to the strategy of "2G and 3G dual-mode switching", enhancing the user experience of terminal, and also prompting the development of the TD-SCDMA network.

PREFERRED EMBODIMENTS OF THE PRESENT INVENTION

The embodiments of the present invention will be described in detail in conjunction with accompanying drawings hereinafter. It should be illustrated that the embodiments of the application and the features in the embodiments can be combined with each other randomly without conflict.

In the present invention, the condition of the dual-network dual-standby single-card single-number of the dual-modem architecture is mainly used for the dual-network dual-standby terminal.

Figure 1:
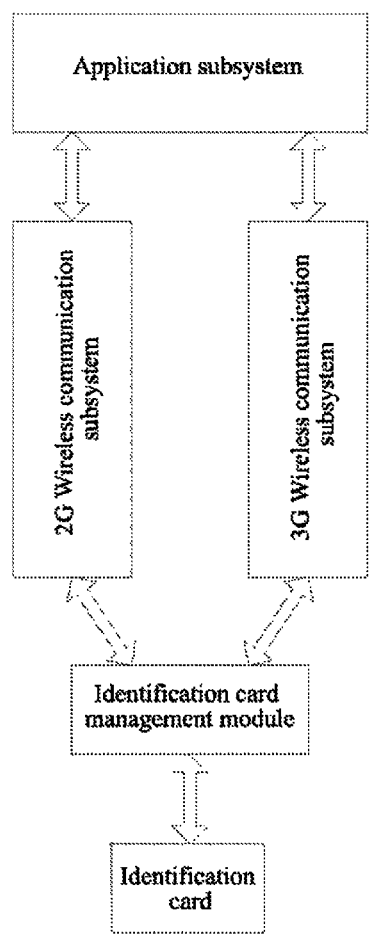
FIG. 1 is a schematic diagram of an apparatus for performing communication by a dual-network dual-standby terminal according to an embodiment of the present invention.

As shown in FIG. 1, the dual-network dual-standby terminal comprises an Application (AP) subsystem, a 3G wireless communication subsystem, a 2G wireless communication subsystem and an identification card management module (a Subscriber Identity Module (SIM) card management module), wherein the identification card management module is connected with a SIM card, and the identification card stores the information used for the 2G network and the 3G network to perform identity authentication, and the 3G wireless communication subsystem is connected with the application subsystem and the identification card management module, and the 2G wireless communication subsystem is connected with the application subsystem and the identification card management module.

The 3G wireless communication subsystem and the 2G wireless communication subsystem constitute a wireless communication (CP) subsystem.

In the present invention, a dedicated processor (such as a chip microcomputer or an ARM and so on) is utilized to operate the identification card management module to manage the identification card and 2 wireless Modems (2G wireless communication subsystem and the 3G wireless communication subsystem) access the identification card through the identification card management module, which can make the use and the management of the identification card more flexible and efficient.

Herein, the identification card management module specifically can be a SIM card management module, and the identification card specifically can be a SIM card.

Specifically, in the present invention, the identification card management module reads and stores the information in the identification card; the 2G wireless communication subsystem and the 3G wireless communication subsystem read the information of the identification card in the identification card management module, and communicate with the corresponding network by using the read information.

That is, the 2G wireless communication subsystem reads the information of the identification card in the identification card management module, and communicates with the 2G network by using the read information; and the 3G wireless communication subsystem reads the information of the identification card in the identification card management module, and communicates with the 3G network by using the read information.

After the identification card management module reads the information in the identification card, all or a part of the information in the identification card can be stored locally, for example, one or more of three parameters: a Public Land Mobile Network (PLMN) identifier, a Temporary Mobile Subscriber Identity (TMSI) and a Location Area Identification (LAI), in the identification card can be stored locally.

In addition, the International Mobile Subscriber Identification Number (IMSI) of the identification card may not be stored in the identification card management module. In the process of the 2G wireless communication subsystem communicating with the 2G network, if there is a need to transmit an IMSI of the identification card to the 2G network, the 2G wireless communication subsystem accesses the identification card through the identification card management module and obtains the IMSI of the identification card; and in the process of the 3G wireless communication subsystem communicating with the 3G network, if there is a need to transmit the IMSI of the identification card to the 3G network, the 3G wireless communication subsystem accesses the identification card through the identification card management module and obtains the IMSI of the identification card.

In the embodiments of the present invention, services can be split, i.e. for the features that the bandwidth of the 3G network is large and the 3G network is suitable for data services while the accumulation of the optimization work of the 2G network is more and the support to the 2G service, such as voice, is better, 2G and 3G dual-network dual-standby is utilized at the terminal side to implement service splitting of a Packet Switching (PS) service and a Circuit Switching (CS) service (i.e. the 2G network bears the CS service, and the 3G network bears the PS data service), to avoid the problems brought out by the coexistence of the current 2G network and 3G network.

Specifically, when a subscriber of the dual-network duel-standby terminal initiates a service, the application subsystem selects a network according to the type of service, and when the initiated service is a PS service or a video phone service in a CS service, the application subsystem selects the 3G service, and when the initiated service is a CS service except for the video phone service, the application subsystem selects the 2G network; and when the selected network meets the condition of the signal intensity, the wireless communication subsystem corresponding to the selected network performs communication through the selected network.

Wherein, although the video phone service is a CS domain based service, as the service must be borne through the 3G network, when the subscriber initiates a video phone service, it is required to select the 3G network.

The above-described meeting the condition of the signal intensity refers that the signal intensity of the network can bear related services (i.e. initiated services). During specific implementation, it can be determined that the condition of the signal intensity is met when the signal intensity of the network is greater than a specified threshold.

In the present invention, the initiated PS service can be adjusted by using the following mode, which comprises:

1. When the initiated service is a PS service and the application subsystem selects the 3G network, if the application subsystem determines that the PS service cannot be initiated according to the signal intensity of the current 3G network monitored by the 3G wireless communication subsystem, notifying the 2G wireless communication subsystem to activate a 2G data link of the 2G network for initiating the service;

2. In the process of the 3G wireless communication subsystem performs communication through the 3G network while the initiated service is a PS service, if the application subsystem determines that the signal intensity of the current 3G network is reduced to an extent that the PS service cannot be borne according to the signal intensity of the current 3G network monitored by the 3G wireless communication subsystem, the application subsystem notifying the 3G wireless communication subsystem and 2G wireless communication subsystem, switching a Packet Data Protocol (PDP) data link corresponding to the PS service from a 3G data link to the 2G data link;

3. When the 2G wireless communication subsystem performs the PS service by using the 2G data link, if the application subsystem determines that the signal intensity of the current 3G network is increased to an extent that the PS service can be borne according to the signal intensity of the current 3G network monitored by the 3G wireless communication subsystem, the application subsystem notifying the 3G wireless communication subsystem and the 2G wireless communication subsystem, switching the PDP data link corresponding to the PS service from the 2G data link to the 3G data link.

During specific implementation, it can be the application subsystem that judges the signal intensity of the current 3G network, and if the signal intensity is less than or equal to the specified threshold, it is determined that the PS service cannot be initiated or the PS service cannot be borne, and if the signal intensity is greater than the specified threshold, it is determined that the PS service can be borne. Of course, the specified thresholds used in the above three conditions can be equal, or can also be unequal.

In addition, for the condition that the initiated service is a video phone service, but the application subsystem determines that the video phone service cannot be initiated according to the signal intensity of the current 3G network monitored by the 3G wireless communication subsystem, the application subsystem controls the video phone service to fall back to a normal voice service, and then notifies the 2G wireless communication subsystem to initiate the voice service.

The above-described 3G network can be a TD-SCDMA network, a Wideband Code Division Multiple Access (WCDMA) network or a CDMA2000 network, and the 2G network can be a GSM network, a Code Division Multiple Access (CDMA) network and so on, and in the embodiments and the application examples of the present invention, they are descried by taking the 3G network as a TD-SCDMA network and the 2G network as a GSM network, but it is not limited thereto, and other types of 3G network and 2G network are also applicable to the present invention.

As described above, the present invention can use a dedicated processor to operate a SIM card management module to manage one SIM card, and two independent wireless communication subsystems access the SIM card through the SIM card management module, and dual-network dual-standby functions are implemented based on using one SIM card to split different services.

The present invention will be further described according to an application example of using a 3G network as a TD-SCDMA network and a 2G network as a GSM network.

Figure 2:
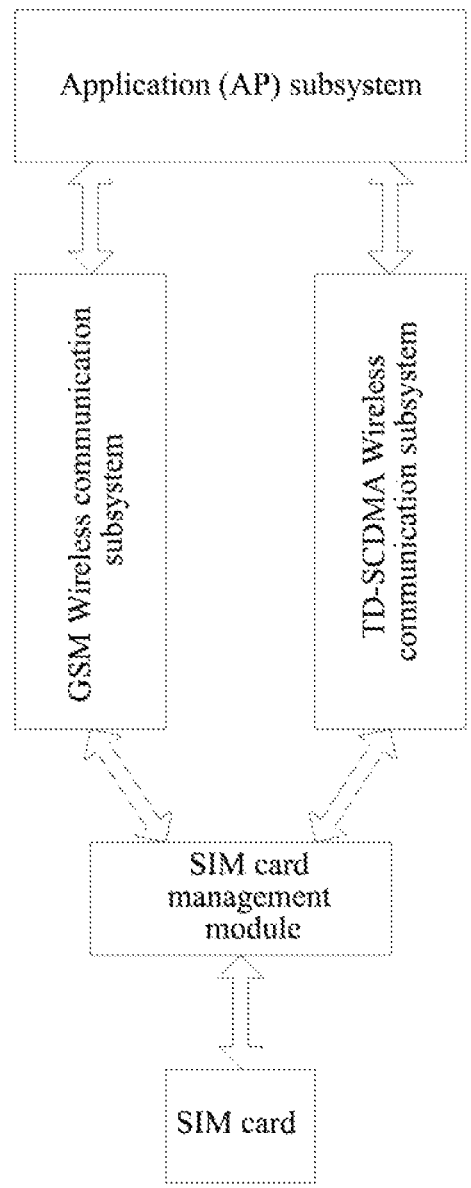
FIG. 2 is a schematic diagram of an apparatus for performing communication by a dual-network dual-standby terminal according to an application example of the present invention.

As shown in FIG. 2, the present example implements bearing and splitting CS and PS services in the 2G and 3G network by using a TD-SCDMA/GSM dual-network dual-standby mobile phone of "Application (AP)+TD-SCDMA Modem (wireless)+GSM Modem (wireless)" triple core architecture, wherein, the AP portion is a primary module responsible for the application, and two wireless communication subsystems, i.e. the TD-SCDMA modem and the GSM modem are respectively responsible for interaction with the 2G network and interaction with the 3G network. In order to implement two wireless modules using the function of one SIM card together, a dedicated processor is used to operate a SIM card management module to manage one SIM card. When being initialized, the SIM card management module can access the SIM card directly and store data of the SIM card into the SIM card management module, and the TD-SCDMA Modem and the GSM Modem access the SIM card through the SIM card management module, to implement the function of two independent wireless communication modules accessing the same SIM card in theory, thus achieving the purpose of dual-network dual-standby single-card single-number.

As shown in FIG. 2, the apparatus for implementing CS and PS service splitting of the 2G and 3G dual-network dual-standby terminal based on the dual-network dual-standby single-card single-number in the present embodiment comprises the following modules:

A. Application (AP) Subsystem

The AP subsystem has an application processor module with an independent CPU, and it is a main control system of the mobile terminal and is responsible for implementing interaction with the subscriber, and if the subscriber needs to perform operations in terms of wireless communication or SIM card, the system is responsible for controlling the corresponding wireless communication system to implement related functions. In the present example, the subsystem has the following functions:

1. The various services are classified in accordance with a principle of "the CS service goes through the 2G network and the PS service goes through the 3G network", and when a subscriber initiates a service, it is judged whether it is a CS service, and the service is initiated from the GSM wireless communication subsystem, and if it is a PS service, the service is initiated from the TD-SCDMA wireless communication subsystem. Wherein, since the CS64kbps video phone is a TD-SCDMA network specific service, the video phone service can also be initiated through the TD-SCDMA wireless communication subsystem.

2. According to the signal intensity of the TD-SCDMA network where the TD-SCDMA wireless communication subsystem is located, which the TD-SCDMA wireless communication subsystem is responsible for monitoring, the current PS service strategy of the terminal is adjusted. For example, when the signal intensity of the TD-SCDMA network where the TD-SCDMA wireless communication subsystem is located, which is monitored by the TD-SCDMA wireless communication subsystem, is not enough to support the initiating of the related data services, the application subsystem can initiate related services by the GSM wireless communication subsystem activating a 2G data link.

When the terminal is in the process of using a default TD-SCDMA network to perform the data service and the network signal of the location where the terminal is located becomes weaker to be not enough to support normal operation of the related service, the application subsystem is responsible for switching the related PDP data link to the 2G data link which the GSM wireless communication subsystem is responsible for, to continue normal operation of related services.

B. GSM Wireless Communication Subsystem

The GSM wireless communication subsystem is responsible for interaction with the GSM network, and it bears various CS services.

The GSM wireless communication subsystem comprises a GSM Modem (in the present example, the GSM wireless communication subsystem is regarded as the GSM Modem), which is primarily responsible for bearing all CS domain services of the whole terminal except for the video phone and temporarily bearing related data services through the 2G data link when the TD-SCDMA signal is not good.

The GSM Modem and the SIM card management module are connected by using hardware, such as UART, USB, I2C bus and so on, which facilitates reading parameters of the SIM card from the SIM card management module when initializing the GSM Modem.

C. TD-SCDMA Wireless Communication Subsystem

The TD-SCDMA wireless communication subsystem is responsible for interaction with the TD-SCDMA network and bearing various PS services and video phone functions.

The TD-SCDMA wireless communication subsystem comprises a TD-SCDMA Modem (in the present example, it can be considered that the TD-SCDMA wireless communication subsystem is the TD-SCDMA Modem). The TD-SCDMA Modem of the present embodiment is different from the currently commercial TD-SCDMA Modem, and it does not possess a TD-SCDMA/GSM dual-mode switching function and only operates in the "TD-SCDMA ONLY" mode. It is primarily responsible for the data service based on the TD-SCDMA network and data interaction of the video phone service, and monitoring of signal intensity of the TD-SCDMA network where the current terminal is located, when the signal becomes weaker to a certain value, notifying the AP application subsystem to switch the PS service to a GSM wireless communication subsystem.

The TD-SCDMA Modem and the SIM card management module are connected by using hardware, such as UART, USB, I2C bus and so on, which facilitates reading parameters of the SIM card from the SIM card management module when initializing the TD-SCDMA Modem.

D. SIM Card Management Module

The SIM card management module is responsible for directly managing the SIM card and providing an interface to access the SIM card for the TD-SCDMA Modem and the GSM Modem.

In the process of being started, the SIM card management module is responsible for initializing the SIM card and reading and storing most of parameters of the SIM card into the SIM card management module, for example, PLMN, TMSI and LAI and so on, and it is also responsible for being ready to be read by the TD-SCDMA Modem and the GSM Modem and completing the network registration of the TD-SCDMA Modem and the GSM Modem.

When there is a need to access the SIM card, the TD-SCDMA Modem and the GSM Modem can access the SIM card through the interface provided by the SIM card management module.

Figure 3:
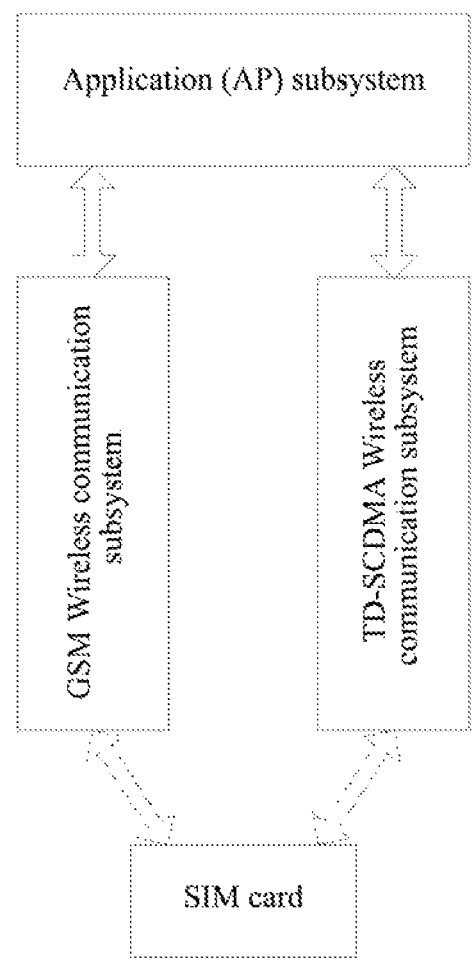
FIG. 3 is an effect diagram of an apparatus for performing communication by a dual-network dual-standby terminal according to an application example of the present invention.

As shown in FIG. 3, the present example is equivalent to two Modems simultaneously accessing the same SIM card to implement the function of dual-network dual-standby single-card single-number in effect.

In the process of starting up and initialization, since the SIM card is actually attached to the SIM card management module, the TD-SCDMA modem and the GSM Modem access the SIM card through the SIM card management module, and in the process of starting up, the SIM card management module is firstly powered on, and the SIM card management module firstly implements the initialization of the SIM card, and it is responsible for reading and storing most of parameters of the SIM card into the SIM card management module, such as, PLMN, TMSI and LAI and so on. Then, the TD-SCDMA Modem and the GSM Modem are powered on, and the TD-SCDMA Modem and the GSM Modem read parameters of the SIM card from the SIM card management module and initiate the initialization procedure of the protocol stack, and involving the authentication algorithm still needs the TD-SCDMA Modem and the GSM Modem to access the SIM card through an interface provided by the SIM card management module, and the IMSI number of the same SIM card is finally reported to respective corresponding TD-SCDMA network and GSM network.

Taking a normal voice phone service as an example, when a subscriber makes a voice phone call through a dialing interface, the application subsystem invokes the GSM wireless communication subsystem to interact with the GSM network according to a logic of "the CS service goes through the GSM network and the PS service goes through the TD-SCDMA network", and bears services with the other party through the GSM network. When being called, the network device establishes a link with the GSM wireless communication subsystem of the terminal and bears a service according to the information registered by terminal at the network side (which is primarily an IMSI number which is used by the terminal when registering in the GSM network). So do other CS service procedures, such as a short message and so on.

It needs to be illustrated that, since the TD-SCDMA video phone service based on the CS circuit domain needs the TD-SCDMA network to perform the bearing, after the user initiates the call, the application subsystem will invoke the TD-SCDMA wireless communication subsystem to perform interaction and data bearing with the TD-SCDMA network. And when being called, the network device, according to the information registered in the network side by the terminal (mainly IMSI number used by the terminal when registering in the TD-SCDMA network), establishes the link with the TD-SCDMA wireless communication subsystem of the terminal and bears the service.

When the user surfs the Internet through the browser, after the user inputs the relevant website address in the browser, the application subsystem firstly inquires the signal intensity of the TD-SCDMA network where the terminal is currently located through the TD-SCDMA wireless communication subsystem. When the application subsystem knows that the network signal meets the requirement, and then it establishes the data link channel based on the TD-SCDMA network and perform the interaction of the relevant service data through the TD-SCDMA wireless communication subsystem and the corresponding network serving device. When the application subsystem knows that the network signal does not meet the requirement, the application subsystem will initiatively establish the data link channel based on the GSM network to substitute the TD-SCDMA network to finish the networking service through the GSM wireless communication subsystem and the corresponding network serving device. Certainly, when the terminal surfs the Internet by using the default TD-SCDMA wireless communication subsystem and the TD-SCDMA network, and when the network signal is weakened to be not enough to meet the service requirement, the application subsystem of terminal will disconnect the PDP data link based on the TD-SCDMA network initiatively through the TD-SCDMA wireless communication subsystem and immediately invokes the GSM wireless communication subsystem to make the terminal and GSM network establish the data link, to maintain the networking service. On the contrary, when the terminal surfs the Internet by using the GSM wireless communication subsystem and GSM network temporarily, and when the application subsystem knows that the TD-SCDMA network signal recovers and meets the requirement of data service through the TD-SCDMA wireless communication subsystem, it will switch the relevant PDP data link back to the TD-SCDMA data link.

Other format of data service is basically similar to the procedure of surfing the Internet through the browser, which will not be described here. However, for the multimedia message and the PushMail of the mail service, due to the special PUSH notification message mechanism in its service procedure, the interaction procedure is a little more complex when receiving the relevant multimedia message and PushMail mail passively. Since the PUSH notification message belongs to the CS domain, the network side will firstly send the relevant PUSH notification message to the application subsystem of terminal through the GSM network and the GSM communication subsystem, and then the application subsystem performs scheduling based on the relevant PS service strategy according to the current network situation.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limit to any specific form of the combination of the hardware and software.

The above description is only the preferred embodiments of the present invention and is not intended to limit the present invention. For those skilled in the art, the present invention can have various modifications and variations. All of modifications, equivalents and/or variations without departing from the spirit and essence of the present invention should be included in the protection scope of the present invention.

Industrial Applicability

With the method and apparatus according to the present invention, the dual-network dual-standby function can be implemented by merely using a single SIM card, and compared with other terminals with dual-network dual-standby dual-card dual-number, it is beneficial to the design of the hardware and the structure, thus saving the cost. Compared with the existing 2G and 3G dual-mode single-standby terminal technology, the present invention reduces the probability of dual-mode switching by the dual-network dual-standby technology (there is a part of switching only during the data service) while taking account of the specialty of the CS domain service of the 2G network and the specialty of the data service of the 3G network, and thereby fundamentally reducing and avoiding faults such as frequent network reselection, serious power consumption, dropped call, off-line and so on of the 2G and 3G dual-mode single-standby terminal due to the strategy of "2G and 3G dual-mode switching", enhancing the user experience of terminal, and also prompting the development of the TD-SCDMA network.

What is claimed is:

1. A method for performing communication by a dual-network terminal, characterized in that the dual-network terminal is a dual-network and dual-standby terminal, and the dual-network and dual-standby terminal comprises: an application subsystem, a 3G wireless communication subsystem, a 2G wireless communication subsystem and an identification card management module, and the identification card management module is connected with an identification card, which stores information used for 2G network and 3G network to perform identity authentication, and the 3G wireless communication subsystem is connected with the application subsystem and the identification card management module, and the 2G wireless communication subsystem is connected with the application subsystem and the identification card management module, and the method comprises:

the identification card management module reading and storing the information in the identification card;

the 2G wireless communication subsystem reading the information of the identification card in the identification card management module, and communicating with the 2G network by using the read information;

the 3G wireless communication subsystem reading the information of the identification card in the identification card management module, and communicating with the 3G network by using the read information;

when a subscriber of the dual-network duel-standby terminal initiates a service, the application subsystem selecting a network according to type of the service, and when the initiated service is a Packet Switching (PS) service or a video phone service in a Circuit Switching (CS) service, the application subsystem selecting the 3G network, and when the initiated service is the CS service except for the video phone service, the application subsystem selecting the 2G network;

when the selected network meets a condition of signal intensity, a wireless communication subsystem corresponding to the selected network performing communication through the selected network;

when the initiated service is the PS service and the application subsystem selects the 3G network, if the application subsystem determines that the PS service cannot be initiated according to the signal intensity of current 3G network monitored by the 3G wireless communication subsystem, notifying the 2G wireless communication subsystem to activate a 2G data link of the 2G network to initiate the service;

when the initiated service is the PS service, in a process of the 3G wireless communication subsystem performing communication through the 3G network, if the application subsystem determines that the signal intensity of the current 3G network is reduced to an extent that the PS service cannot be borne according to the signal intensity of the current 3G network monitored by the 3G wireless communication subsystem, the application subsystem notifying the 3G wireless communication subsystem and the 2G wireless communication subsystem to switch a Packet Data Protocol (PDP) data link corresponding to the PS service from a 3G data link to the 2G data link; and when the 2G wireless communication subsystem performs the PS service by using the 2G data link, if the application subsystem determines that the signal intensity of the current 3G network is increased to an extent that the PS service can be borne according to the signal intensity of the current 3G network monitored by the 3G wireless communication subsystem, the application subsystem notifying the 3G wireless communication subsystem and the 2G wireless communication subsystem to switch the PDP data link corresponding to the PS service from the 2G data link to the 3G data link.

2. The method according to claim 1, wherein,
in the step of the identification card management module reading and storing the information in the identification card, the identification card management module reading and locally storing one or more of three parameters in the identification card: a Public Land Mobile Network (PLMN) identifier, a Temporary Mobile Subscriber Identity (TMSI) and a Location Area Identification (LAI).

3. The method according to claim 1, further comprising:
in a process of the 2G wireless communication subsystem communicating with the 2G network, if there is a need to transmit an International Mobile Subscriber Identification Number (IMSI) of the identification card to the 2G network, the 2G wireless communication subsystem accessing the identification card through the identification card management module and obtaining the IMSI of the identification card; and
in a process of the 3G wireless communication subsystem communicating with the 3G network, if there is a need to transmit the IMSI of the identification card to the 3G network, the 3G wireless communication subsystem accessing the identification card through the identification card management module and obtaining the IMSI of the identification card.

4. The method according to claim 1, wherein,
the 3G network is a Time Division-Synchronous Code Division Multiple Access (TD-SCDMA) network, a Wideband Code Division Multiple Access (WCDMA) network or a CDMA2000 network, and the 2G network is a Global System for Mobile Communications (GSM) network or a Code Division Multiple Access (CDMA).

5. A dual-network and dual-standby terminal, comprising:
a 3G wireless communication subsystem, a 2G wireless communication subsystem, an identification card management module and an application subsystem,
wherein, the identification card management module is connected with an identification card, which stores information used for 2G network and 3G network to perform identity authentication, and the 3G wireless communication subsystem is connected with the application subsystem and the identification card management module, and the 2G wireless communication subsystem is connected with the application subsystem and the identification card management module, wherein,
the identification card management module is configured to read and store the information in the identification card;
the 2G wireless communication subsystem is configured to read the information of the identification card in the identification card management module, and communicate with the 2G network by using the read information;
the 3G wireless communication subsystem is configured to read the information of the identification card in the identification card management module, and communicate with the 3G network by using the read information;
the application subsystem is configured to: when a subscriber of the dual-network duel-standby terminal initiates a service, select a network according to type of the service, and when the initiated service is a Packet Switching (PS) service or a video phone service in a Circuit Switching (CS) service, select the 3G network and notify the 3G wireless communication subsystem, and when the initiated service is the CS service except for the video phone service, select the 2G network and notify the 2G wireless communication subsystem;
the 3G wireless communication subsystem is further configured to monitor a signal intensity of current 3G network, and notify the application subsystem of the signal intensity of the current 3G network; and when the application subsystem selects the 3G network and the 3G network meets a condition of the signal intensity, perform communication through the 3G network;
the 2G wireless communication subsystem is further configured to: when the application subsystem selects the 2G network and the 2G network meets the condition of the signal intensity, perform communication through the 2G network.
the application subsystem is further configured to:
when the initiated service is the PS service, if determining that the PS service cannot be initiated according to the signal intensity of the current 3G network monitored by the 3G wireless communication subsystem, notify the 2G wireless communication subsystem to activate a 2G data link of the 2G network for initiating the PS service;
when the initiated service is the PS service, in a process of performing communication through the 3G network, if determining that the signal intensity of the current 3G network is reduced to an extent that the PS service cannot be borne according to the signal intensity of the current 3G network monitored by the 3G wireless communication subsystem, notify the 3G wireless communication subsystem and the 2G wireless communication subsystem, and switch a Packet Data Protocol (PDP) data link corresponding to the PS service from a 3G data link to the 2G data link; and
when the 2G wireless communication subsystem performs the PS service by using the 2G data link, if determining that the signal intensity of the current 3G network is increased to an extent that the PS service can be borne according to the signal intensity of the current 3G network monitored by the 3G wireless communication subsystem, notify the 3G wireless communication subsystem and the 2G wireless communication subsystem, and switch the PDP data link corresponding to the PS service from the 2G data link to the 3G data link.

6. The apparatus according to claim 5, wherein, the identification card management module is configured to read and store the information in the identification card according to a following mode: when reading and storing the information in the identification card, reading and locally storing one or more of three parameters in the identification card: a Public Land Mobile Network (PLMN) identifier, a Temporary Mobile Subscriber Identity (TMSI) and a Location Area Identification (LAI).

7. The apparatus according to claim 5, wherein,
the 2G wireless communication subsystem is further configured to: in a process of communicating with the 2G network, if there is a need to transmit an International Mobile Subscriber Identification Number (IMSI) of the identification card to the 2G network, access the identification card through the identification card management module and obtain the IMSI of the identification card;
the 3G wireless communication subsystem is further configured to: in a process of communicating with the 3G network, if there is a need to transmit the IMSI of the identification card to the 3G network, access the identification card through the identification card management module and obtain the IMSI of the identification card.

8. The apparatus according to claim 5, wherein,
the 3G network is a Time Division-Synchronous Code Division Multiple Access (TD-SCDMA) network, a Wideband Code Division Multiple Access (WCDMA) network or a CDMA2000 network, and the 2G network is a Global System for Mobile Communications (GSM) network or a Code Division Multiple Access (CDMA) network.

* * * * *